(12) United States Patent
Pfaendtner et al.

(10) Patent No.: US 6,620,524 B2
(45) Date of Patent: Sep. 16, 2003

(54) NICKEL ALUMINIDE COATING AND COATING SYSTEMS FORMED THEREWITH

(75) Inventors: Jeffrey Allan Pfaendtner, Blue Ash, OH (US); Joseph David Rigney, Milford, OH (US); Ramgopal Darolia, West Chester, OH (US); Reed Roeder Corderman, Niskayuna, NY (US); Richard Arthur Nardi, Jr., Scotia, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/044,618

(22) Filed: Jan. 11, 2002

(65) Prior Publication Data

US 2003/0134139 A1 Jul. 17, 2003

(51) Int. Cl.$^7$ .............................. B32B 15/04; F03B 3/12
(52) U.S. Cl. .................. 428/632; 428/469; 428/633; 428/652; 428/668; 428/680; 428/660; 428/699; 428/701; 428/702; 416/241 R
(58) Field of Search ................................. 428/629, 632, 428/633, 650, 652, 655, 668, 678, 680, 660, 469, 699, 702, 701; 416/241 R

(56) References Cited

U.S. PATENT DOCUMENTS

| 5,975,852 A | 11/1999 | Nagaraj et al. |
| 6,153,313 A | 11/2000 | Rigney et al. |
| 6,255,001 B1 | 7/2001 | Darolia |
| 6,291,084 B1 | 7/2001 | Darolia et al. |

*Primary Examiner*—Deborah Jones
*Assistant Examiner*—Jennifer McNeil
(74) *Attorney, Agent, or Firm*—David L. Narciso; Gary M. Hartman; Domenica N. S. Hartman

(57) ABSTRACT

A predominantly beta-phase NiAl overlay coating for use as an environmental coating or a TBC bond coat for articles used in hostile thermal environments, such as components of a gas turbine engine. The coating contains up to about 4 atomic percent hafnium, such as in excess of 1.0 atomic percent hafnium. The coating may also contain about 2 to about 15 atomic percent chromium.

20 Claims, 2 Drawing Sheets

NICKEL ALUMINIDE COATING AND COATING SYSTEMS FORMED THEREWITH

STATEMENT REGARDING FEDERALLY SPONSORED RESEARCH

This invention was made with Government support under Agreement No. F33615-98-C-2893 awarded by the U.S. Department of the Air Force. The Government has certain rights in the invention.

CROSS REFERENCE TO RELATED APPLICATIONS

Not applicable.

BACKGROUND OF THE INVENTION

1. Field of the Invention

The present invention generally relates to coatings of the type used to protect components exposed to high temperature environments, such as the hostile thermal environment of a gas turbine engine. More particularly, this invention is directed to a predominantly beta-phase NiAl (βNiAl) overlay coating alloyed with hafnium for use as an environmental coating and as a bond coat for a thermal barrier coating.

2. Description of the Related Art

Components within the turbine, combustor and augmentor sections of gas turbine engines are susceptible to oxidation and hot corrosion attack, in addition to high temperatures that can decrease their mechanical properties. Consequently, these components are often protected by an environmental coating alone or in combination with an outer thermal barrier coating (TBC), which in the latter case is termed a TBC system. Ceramic materials such as zirconia ($ZrO_2$) partially or fully stabilized by yttria ($Y_2O_3$), magnesia (MgO) or other oxides, are widely used as TBC materials.

Various metallic coating systems have been used as environmental coatings for gas turbine engine components, the most widely used being diffusion coatings such as diffusion aluminides and platinum aluminides (PtAl). Diffusion aluminide coatings are formed by reacting the surface of a component with an aluminum-containing vapor to deposit aluminum and form various aluminide intermetallics that are the products of aluminum and elements of the substrate material. Diffusion aluminide coatings formed in a nickel-base superalloy substrate contain such environmentally-resistant intermetallic phases as beta NiAl and gamma prime (γ') $Ni_3Al$. By incorporating platinum, the coating further includes PtAl intermetallic phases, usually PtAl and $PtAl_2$, and platinum in solution in the NiAl intermetallic phases.

Another widely used coating system is an overlay coating known as MCrAlX, where M is iron, cobalt and/or nickel, and X is an active element such as yttrium or another rare earth or reactive element. MCrAlX overlay coatings are typically deposited by physical vapor deposition (PVD), such as electron beam PVD (EBPVD) or sputtering, or by plasma spraying. MCrAlX overlay coatings differ from diffusion aluminide coatings as a result of the elements transferred to the substrate surface and the processes by which they are deposited, which can result in only limited diffusion into the substrate. If deposited on a nickel-base superalloy substrate, an MCrAlX coating will comprise a metallic solid solution that contains both gamma prime and beta nickel aluminide phases.

Used in combination with TBC, a diffusion aluminide or MCrAlX overlay coating serves as a bond coat to adhere the TBC to the underlying substrate. The aluminum content of these bond coat materials provides for the slow growth of a strong adherent continuous aluminum oxide layer (alumina scale) at elevated temperatures. This thermally grown oxide (TGO) protects the bond coat from oxidation and hot corrosion, and chemically bonds the TBC to the bond coat.

More recently, overlay coatings (i.e., not a diffusion) of predominantly beta-phase nickel aluminide intermetallic have been proposed as environmental and bond coat materials. The NiAl beta phase exists for nickel-aluminum compositions of about 30 to about 60 atomic percent aluminum, the balance of the nickel-aluminum composition being nickel. Notable examples of beta-phase NiAl coating materials include commonly-assigned U.S. Pat. No. 5,975,852 to Nagaraj et al., which discloses a NiAl overlay bond coat optionally containing one or more active elements, such as yttrium, cerium, zirconium or hafnium, and commonly-assigned U.S. Pat. No. 6,291,084 to Darolia et al., which discloses a NiAl overlay coating material containing chromium and zirconium. Commonly-assigned U.S. Pat. Nos. 6,153,313 and 6,255,001 to Rigney et al. and Darolia, respectively, also disclose beta-phase NiAl bond coat and environmental coating materials. The beta-phase NiAl alloy disclosed by Rigney et al. contains chromium, hafnium and/or titanium, and optionally tantalum, silicon, gallium, zirconium, calcium, iron and/or yttrium, while Darolia's beta-phase NiAl alloy contains zirconium. The beta-phase NiAl alloys of Nagaraj, Darolia et al., Rigney et al., and Darolia have been shown to improve the adhesion of a ceramic TBC layer, thereby inhibiting spallation of the TBC and increasing the service life of the TBC system.

The role that hafnium plays in improving spallation resistance of a TBC was investigated by Nagaraj and Rigney et al. Nagaraj investigated several Ni-49.8Al-0.5Hf alloys, and concluded that improved spallation resistance could be obtained if one or more oxygen-active elements, such as yttrium, hafnium, cerium, zirconium, etc., were present at levels of up to 1.0 atomic percent. Rigney et al. investigated other NiAl alloys containing hafnium, such as Ni-49.5Al-0.5Hf, Ni-48.5Al-1.0Cr-0.5Hf, Ni-49.45Al-0.5Hf-0.05Ga, Ni-48.3Al-1.0Ti-0.5Hf-0.2Ga, Ni-47.15Al-2.0Cr-0.25Fe-0.5Hf-0.1Y, Ni-48.05Al-0.75Ti-0.5Cr-0.5Hf-0.2Ga, Ni-44.3Al-5.0Ti-0.5Hf-0.2Ga, and Ni-45.5Al-1.04Ti-0.14Hf. Based on these results using up to 0.5 atomic percent hafnium, it was projected that, when combined with chromium, titanium, etc., as much as 2.0 atomic percent hafnium would be beneficial to a beta-phase NiAl bond coat.

Even with the advancements discussed above, there remains a considerable and continuous effort to further increase the service life of TBC systems by improving the spallation resistance of the thermal insulating layer.

BRIEF SUMMARY OF THE INVENTION

The present invention generally provides a protective overlay coating for articles used in hostile thermal environments, such as turbine, combustor and augmentor components of a gas turbine engine. The invention is particularly directed to a predominantly beta-phase NiAl overlay coating for use as a bond coat for a thermal barrier coating (TBC) deposited on the overlay coating. According to the invention, hafnium at levels significantly higher than previously expected can be incorporated into a NiAl-based coating composition, yielding a coating system capable of exhibiting improved spallation resistance as compared to prior bond coat materials, most notably platinum aluminide diffusion coatings. A preferred composition for the beta-phase NiAl overlay bond coat of this invention further contains about 2 up to about 15 atomic percent chromium. Other possible alloying elements of the bond coat include titanium, tantalum and zirconium.

As a beta-phase NiAl intermetallic, the overlay coating of this invention contains 30 to 60 atomic percent aluminum, preferably in the stoichiometric amount with nickel, so as to be predominantly of the beta-NiAl phase. With the addition of hafnium, the overlay coating also contains hafnium intermetallic phases, such as beta prime (β') (or Heusler) phases ($Ni_2AlHf$), which are believed to precipitate strengthen the beta-NiAl phase. With the addition of chromium, the coating benefits from improved hot corrosion, solid solution strengthening by chromium, and precipitation strengthening from fine α-Cr phases dispersed within the beta phase of the coating. When present together in a beta-phase NiAl overlay bond coat, these phases have been shown to improve the spallation resistance of a TBC deposited on the overlay bond coat. The beta-phase NiAl overlay coating of this invention is also believed to have application as an environmental coating.

Other objects and advantages of this invention will be better appreciated from the following detailed description.

DETAILED DESCRIPTION OF THE INVENTION

Figure 1:
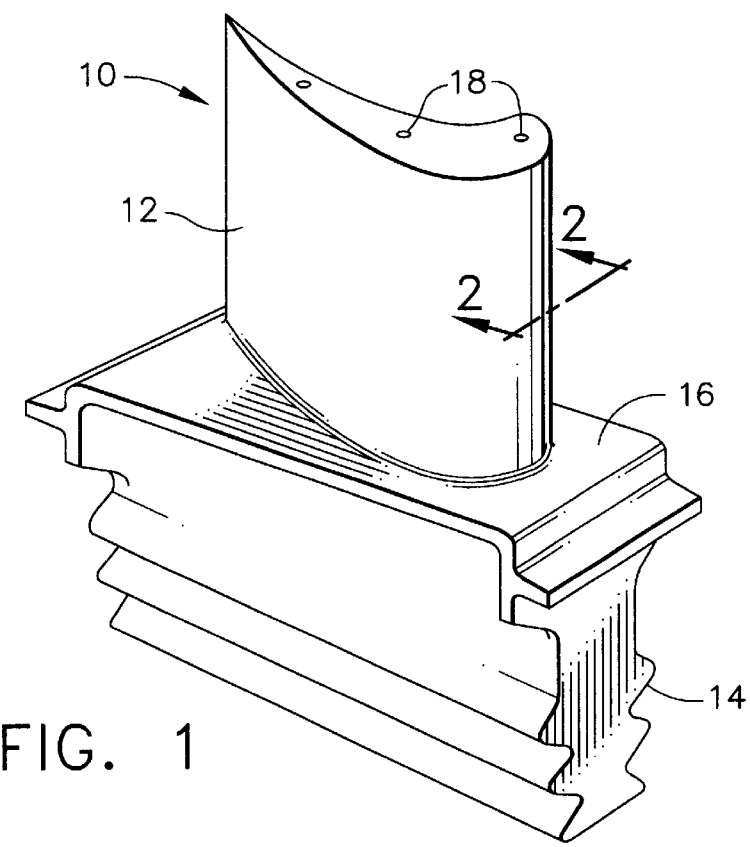
FIG. 1 is a perspective view of a high pressure turbine blade.

The present invention is generally applicable to components that operate within environments characterized by relatively high temperatures, and are therefore subjected to severe thermal stresses and thermal cycling. Notable examples of such components include the high and low pressure turbine nozzles and blades, shrouds, combustor liners and augmentor hardware of gas turbine engines. One such example is the high pressure turbine blade 10 shown in FIG. 1. The blade 10 generally includes an airfoil 12 against which hot combustion gases are directed during operation of the gas turbine engine, and whose surface is therefore subjected to severe attack by oxidation, corrosion and erosion. The airfoil 12 is anchored to a turbine disk (not shown) with a dovetail 14 formed on a root section 16 of the blade 10. Cooling holes 18 are present in the airfoil 12 through which bleed air is forced to transfer heat from the blade 10. While the advantages of this invention will be described with reference to the high pressure turbine blade 10 shown in FIG. 1, and particularly nickel-base superalloy blades of the type shown in FIG. 1, the teachings of this invention are generally applicable to any component on which a coating system may be used to protect the component from its environment.

Figure 2:
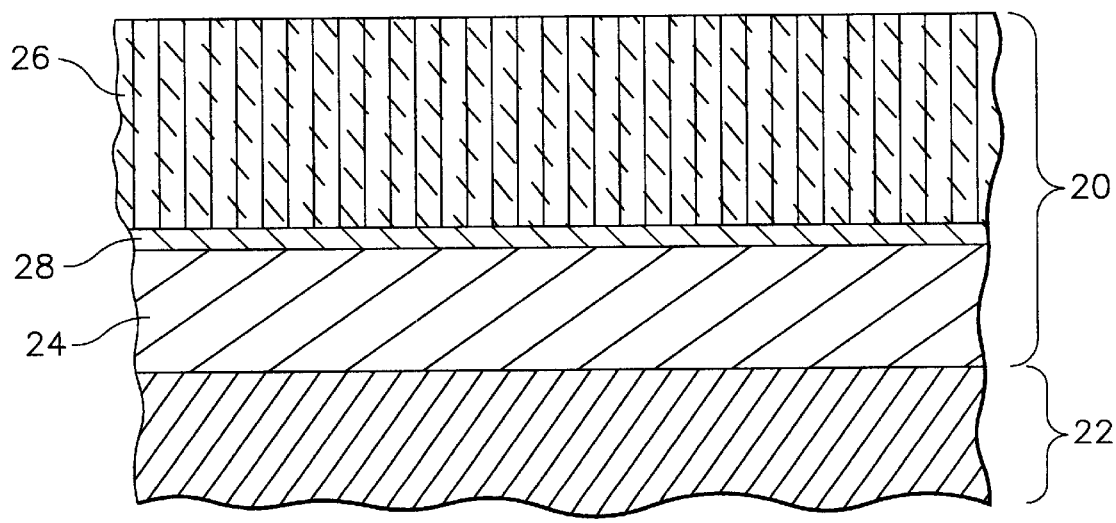
FIG. 2 is a cross-sectional view of the blade of FIG. 1 along line 2—2, and shows a thermal barrier coating system on the blade in accordance with an embodiment of this invention.

Represented in FIG. 2 is a TBC system 20 of a type that benefits from the teachings of this invention. As shown, the coating system 20 includes a ceramic layer 26 bonded to the blade substrate 22 with a NiAl overlay coating 24, which therefor serves as a bond coat to the ceramic layer 26. The substrate 22 (blade 10) is preferably a high-temperature material, such as an iron, nickel or cobalt-base superalloy. To attain a strain-tolerant columnar grain structure, the ceramic layer 26 is preferably deposited by physical vapor deposition (PVD), though other deposition techniques could be used. A preferred material for the ceramic layer 26 is an yttria-stabilized zirconia (YSZ), with a suitable composition being about 3 to about 20 weight percent yttria, though other ceramic materials could be used, such as yttria, nonstabilized zirconia, or zirconia stabilized by ceria ($CeO_2$), scandia ($Sc_2O_3$) or other oxides. The ceramic layer 26 is deposited to a thickness that is sufficient to provide the required thermal protection for the underlying substrate 22 and blade 10, generally on the order of about 100 to about 300 micrometers. As with prior art TBC systems, the surface of the overlay coating 24 oxidizes to form an oxide surface layer (scale) 28 to which the ceramic layer 26 chemically bonds.

According to the invention, the NiAl overlay coating 24 is predominantly of the beta NiAl phase (beta-NiAl) with limited alloying additions. The NiAl overlay coating 24 is preferably deposited using a PVD process such as sputtering, ion plasma, cathodic arc, or melting and evaporation with an electron beam, laser or other higher energy source. It is foreseeable that other deposition techniques could be used, such as thermal spraying of powders or electroplating. According to the invention, a suitable thickness for the overlay coating 24 is about 50 micrometers to protect the underlying substrate 22 and provide an adequate supply of aluminum for oxide formation, though thicknesses of about 10 to about 125 micrometers are believed to be suitable. The above PVD techniques are preferably carried out to reduce the diffusion of the overlay coating 24 into the substrate 22. Preferably, deposition of the overlay coating 24 results in virtually no diffusion between the overlay coating 24 and substrate 22. During subsequent heat treatment to relieve residual stresses generated during the deposition process, a very thin diffusion zone, typically not more than about five micrometers, may develop. A suitable heat treatment is two to four hours at about 1800° F. to 2100° F. (about 980° C. to about 1150° C.) in a vacuum or an inert atmosphere such as argon.

To attain the beta-NiAl intermetallic phase, the NiAl overlay coating 24 of this invention has an aluminum content of about 30 to 60 atomic percent, preferably about 30 to 50 atomic percent, and more preferably at the stoichiometric ratio of 1:1 with nickel. According to this invention, hafnium is also deposited to form the coating 24, in an amount of at least 0.01 atomic percent up to as much as about 4 atomic percent (about 14 weight percent) of the coating 24. For example, the coating 24 may contain in excess of 1 atomic percent, which exceeds the amount taught by Nagaraj et al., or in excess of 2 atomic percent, which exceeds the amount taught by Rigney et al. The desired amount of hafnium is preferably incorporated into the coating 24 by codeposition with the NiAl material.

In a preferred embodiment of the invention, the coating 24 is further alloyed to contain about 2 to about 15 atomic percent chromium, more preferably about 2 to about 10 atomic percent chromium. According to U.S. Pat. No. 6,291,084 to Darolia et al., the presence of chromium in a beta-phase NiAl overlay coating 24 has a significant effect on the spallation resistance of the ceramic layer 26 adhered to the NiAl overlay coating 24 to form the TBC system 20 as a result of solid solution strengthening by chromium and precipitation strengthening from fine α-Cr phases dispersed within the beta phase of the coating 24.

According to the invention, beta-phase NiAl overlay coatings containing hafnium at levels significantly higher than previously predicted have been shown to provide a desirable level of spallation resistance for a ceramic layer deposited on the NiAl overlay coating. These benefits are believed to be the result of the Heusler phases ($Ni_2AlHf$), which are believed to strengthen the coating 24. Based on previous investigations, e.g., Rigney et al., it was unexpected that hafnium would have a beneficial effect at levels as high as 4 atomic percent.

During an investigation leading to this invention, furnace cycle tests (FCT) were performed on TBC systems employing bond coats formed of NiAl+Cr+Hf overlay coatings, which were then compared to FCT test data compiled for PtAl diffusion coatings. The overlay coatings were deposited to have a composition of, in atomic percent, about 5% chromium, up to about 3.4% hafnium, about 40% aluminum, the balance nickel. The coatings were deposited on buttons formed of a single-crystal superalloy known as René N6, with a nominal composition of, by weight, 12.5% Co, 4.2% Cr, 7.2% Ta, 5.75% Al, 5.75% W, 5.4% Re, 1.4% Mo, 0.15% Hf, 0.05% C, 0.004% B, 0.01% Y, the balance nickel. Each overlay coating was formed by co-evaporation using an EBPVD process to a thickness of about 2 mils (about 50 micrometers), followed by a vacuum diffusion heat treatment at about 1975° F. (about 1080° C.) for about two hours to bond the NiAl+Cr+Hf coatings to their substrates and to relieve residual stresses generated during the deposition process. All of the buttons were then coated by EBPVD with above five mils (about 125 micrometers) of 7% YSZ as the TBC material. The spallation life potentials of these coating systems were then evaluated by FCT at about 2125° F. (about 1160° C.) with one hour cycles. Testing was terminated for a given specimen when approximately 20 percent of its TBC had spalled.

Figure 3:
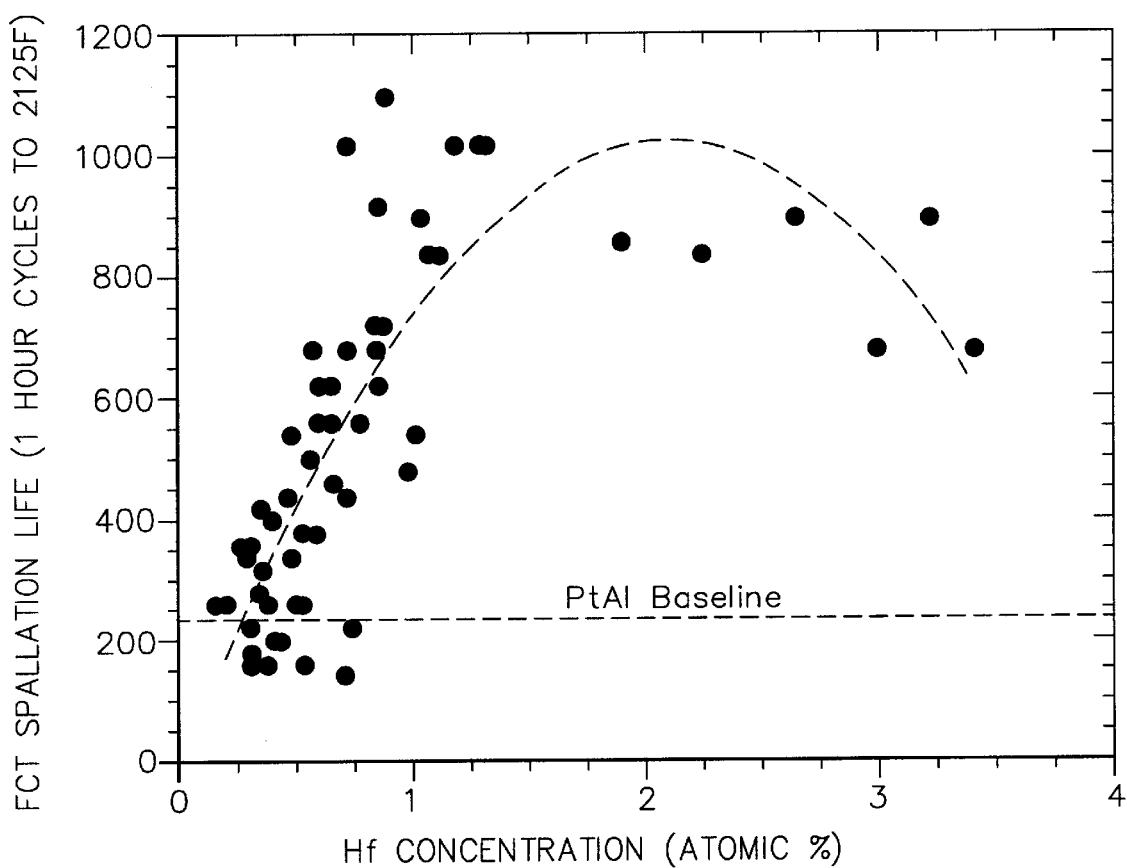
FIG. 3 is a graph illustrating the relative furnace cycle test spallation performance of NiAlCr intermetallic bond coats containing varying amounts of hafnium in accordance with the present invention.

The results of the investigation are illustrated in FIG. 3, which evidences that coating performance was strongly dependent on hafnium content. The results confirm the conclusions of U.S. Pat. No. 6,153,313 to Rigney et al. as to the beneficial effect of hafnium at levels of up to 2.0 atomic percent in the presence of chromium. However, the results also evidence that hafnium levels significantly higher than 2.0 atomic percent are beneficial. More particularly, hafnium levels of greater than 2 atomic percent (about 2.25 atomic percent) and up to 3.4 atomic percent were shown to be consistently beneficial in comparison to the baseline PtAl bond coats. The baseline average FCT lives for PtAl diffusion bond coats are shown in FIG. 3 to be about 238 cycles. In comparison, the NiAl+Cr+Hf test specimens containing greater than 2 atomic percent hafnium exhibited an average FCT life of about 800 cycles, or about 3.4 times greater than the PtAl baseline. Life variations observed at some hafnium levels were believed to result from variations in the distribution of the hafnium-rich phases in the coatings or coating leader content, leading to the conclusion that improved process control to better distribute hafnium in a beta-phase NiAl coating would provide better spallation resistance consistent with the best specimens for a given hafnium content. On this basis, TBC systems with beta-phase NiAl bond coats containing up to 4 atomic percent hafnium are believed to exhibit improved FCT lives over TBC systems with PtAl bond coats.

While the above evaluation was performed with combinations of chromium and hafnium in beta-phase NiAl bond coats, it was also concluded that TBC systems with beta-phase NiAl bond coats containing up to 4 atomic percent hafnium alone are capable of exhibiting suitable FCT lives.

As such, the above results agree with the conclusion of U.S. Pat. No. 5,975,852 to Nagaraj et al. as to the beneficial effect of hafnium at levels of up to 1.0 in beta-phase NiAl, and furthermore that hafnium levels significantly higher than 1.0 atomic percent are beneficial.

While the invention has been described in terms of a preferred embodiment, it is apparent that modifications could be adopted by one skilled in the art. For example, based on investigations reported in U.S. Pat. No. 6,153,313, it is believed that the overlay coating of this invention could be modified to further contain one or more of, in atomic percent, 0.1% to 5% titanium, 0.1% to 5% tantalum, 0.1% to 5% silicon, and 0.01% to 1.5% zirconium. Accordingly, the scope of the invention is to be limited only by the following claims.

What is claimed is:

1. A coating system on a superalloy substrate, the coating system comprising a beta-phase NiAl intermetallic overlay coating containing nickel and, in atomic percent, about 30% to about 60% aluminum, and about 2.25% to about 4% hafnium, the overlay coating consisting essentially of intermetallic phases comprising beta-phase NiAl and hafnium-containing phases.

2. A coating system according to claim 1, further comprising a thermal-insulating ceramic layer adhered to the overlay coating.

3. A coating system according to claim 1, wherein the overlay coating further contains about 2 to about 15 atomic percent chromium.

4. A coating system according to claim 3, wherein the overlay coating consists of nickel, aluminum, chromium, and hafnium.

5. A coating system according to claim 3, wherein the chromium content of the overlay coating is about 2 to about 10 atomic percent.

6. A coating system according to claim 1, wherein the hafnium content of the overlay coating is about 2.25 to about 3.4 atomic percent.

7. A coating system according to claim 1, wherein nickel and aluminum are present in the overlay coating in approximately equal amounts.

8. A coating system according to claim 1, wherein the overlay coating consists of, in atomic percent, about 2% to about 10% chromium, about 2.25% to about 3.4% hafnium, the balance nickel and aluminum in approximately equal amounts.

9. A coating system according to claim 1, wherein the overlay coating further contains at least one of, in atomic percent, 0.1% to 5% titanium, 0.1% to 5% tantalum, 0.1% to 5% silicon, and 0.01% to 1.5% zirconium.

10. A coating system on a superalloy substrate, the coating system comprising a ceramic layer on a beta-phase NiAl intermetallic overlay bond coat, the overlay bond coat consisting of, in atomic percent, 30% to 50% aluminum, about 2% to about 15% chromium, about 2.25% to about 4% hafnium, the balance nickel and optionally one or more elements chosen from the group consisting of 0.1% to 5% titanium, 0.1% to 5% tantalum, 0.1% to 5% silicon, and 0.01% to 1.5% zirconium, the overlay bond coat consisting essentially of intermetallic phases comprising beta-phase NiAl and hafnium-containing intermetallic phases.

11. A coating system according to claim 10, wherein the overlay bond coat contains at least one of, in atomic percent, 0.1% to 5% titanium, 0.1% to 5% tantalum, 0.1% to 5% silicon, and 0.01% to 1.5% zirconium.

12. A coating system according to claim 10, wherein the chromium content of the overlay bond coat is about 2 to about 10 atomic percent.

13. A coating system according to claim 10, wherein the hafnium content of the overlay bond coat is about 2.25 to about 3.4 atomic percent.

14. A coating system according to claim 10, wherein nickel and aluminum are present in the overlay bond coat in approximately equal amounts.

15. A coating system according to claim 10, wherein the overlay bond coat consists of, in atomic percent, about 2% to about 10% chromium, about 2.25% to about 3.4% hafnium, the balance nickel and aluminum in approximately equal amounts.

16. A coating system according to claim 10, wherein the ceramic layer is yttria-stabilized zirconia.

17. A coating system on a superalloy substrate, the coating system comprising a beta-phase NiAl intermetallic overlay coating containing nickel and, in atomic percent, about 30% to about 60% aluminum and 2.25% to about 4% hafnium, the overlay coating consisting essentially of intermetallic phases comprising beta-phase NiAl and hafnium-containing phases.

18. A coating system according to claim 17, further comprising a thermal-insulating ceramic layer adhered to the overlay coating.

19. A coating system according to claim 17, wherein the overlay coating further contains 2 to 15 atomic percent chromium.

20. A coating system according to claim 17, wherein the overlay coating consists of, in atomic percent, 2% to 10% chromium, 2.25% to 3.4% hafnium, the balance nickel and aluminum.

* * * * *